Jan. 20, 1953  J. I. YELLOTT  2,625,791
COAL PULVERIZATION AND COMBUSTION APPARATUS
FOR GAS TURBINE POWER PLANTS
Original Filed Aug. 17, 1946  6 Sheets-Sheet 1

INVENTOR.
JOHN I. YELLOTT
BY
Frederick Grimwold Jr.
ATTORNEY

FIG. 6.

Jan. 20, 1953 J. I. YELLOTT 2,625,791
COAL PULVERIZATION AND COMBUSTION APPARATUS
FOR GAS TURBINE POWER PLANTS
Original Filed Aug. 17, 1946 6 Sheets-Sheet 5

INVENTOR
JOHN I. YELLOTT
BY
Frederick A. Norton
ATTORNEY

Fig. 8. Mollier Diagram for the Open Cycle Gas Turbine

Patented Jan. 20, 1953

2,625,791

UNITED STATES PATENT OFFICE 2,625,791

COAL PULVERIZATION AND COMBUSTION APPARATUS FOR GAS TURBINE POWER PLANTS

John I. Yellott, Cockeysville, Md., assignor to Bituminous Coal Research, Inc., Washington, D. C., a corporation of Delaware Original application August 17, 1946, Serial No. 691,307. Divided and this application July 29, 1947, Serial No. 764,429

4 Claims. (Cl. 60—39.46)

This invention relates to improvements in pressurized combustion of fluidized gaseous streams of finely comminuted or pulverized solid fuels, and, more particularly to novel apparatus for use in the combustion of such fuels. This application is a division of my application Ser. No. 691,307, filed August 17, 1946, for Coal-Fired Gas Turbine Power Plants.

The special features of novelty and advantage of the present invention include combustors provided with pneumatic coal pulverizers, fed by fluidized gaseous streams of relatively coarse, particulate solid fuels, the powdered fuel discharged from the pneumatic pulverizers being handled and burned in a closed pressure system, with the products of combustion being delivered, through suitable fly-ash separators, to high-speed gas turbines coupled to suitable use equipment, such as generators and the like. Other features of novelty and advantage include special equipment for fly-ash removal and elimination of soot, cinders, and like by-products of combustion, as well as the provision of coal-burning power plants having low operating costs; using no water; and having relatively few moving parts to maintain. Further features of novelty and advantage include preheating means for simultaneously heating fluidized solids streams, downstream of the pneumatic pulverizer, and adding a supplementary, accelerated stream of heated air to the solids streams, with discharge of the mixed streams into a combination preheater and cyclonizer to effect further disintegration and devolatilization of the particulate solids, and continuously feeding the resulting combustible fluid to a pressurized combustor.

These and other desirable features of novelty and advantage of the present invention will be described in the accompanying specification, certain preferred forms of equipment being illustrated in the drawings by way of example only, for since the underlying principles may be incorporated in other power-generating equipment, it is not intended to be limited to the forms here shown, except as such limitations are clearly imposed by the appended claims.

In the drawings, like numerals refer to similar parts throughout the several views, of which:

Fig. 3 is a vertical section, Fig. 4 is a horizontal section, and Fig. 5 is an elevation, partly in broken section, of one form of pressure combustion chamber;

In the operation of a power system according to the present invention, coal is fed from a bunker, through a suitable mill or grinder, to pressure hoppers, from which it is delivered, under pressure, to a combustor. The gaseous products of combustion are delivered from the combustor to the gas-turbine, the fly ash being separated en route. The gaseous motive fluid expands in its passage through the turbine, doing work, and is vented to the atmosphere through a regenerator. The turbine and the compressors are mounted on a common shaft which is coupled to a generator in any suitable manner. The equipment is essentially controlled by suitable throttle means controlling the feed of the pulverized fuel, under pressure, to the combustor. Because of the operative characteristics of the gas-turbine, the power developed can be readily controlled by controlling the fuel input, and, consequently, controlling the speed developed.

The combustor system herein comprises essentially a pressure feed inlet for comminuted fuel incorporating a pneumatic flash pulverizer, or other suitable pneumatic pulverizing device, a combustion chamber, including a conduit discharging through a fly ash separator, and a conduit for discharging the products of combustion, free from fly ash, into a gas turbine. As shown schematically in Figs. 1 and 2, the combustor system comprises a combustion chamber 300, an air supply means 350, and an ash separating device 370, together with a flue or pipe 390, delivering cleaned motive fluid from the fly-ash separator to the turbine. Referring now to the detailed showings in Figs. 3 to 5, it will be seen that the combustor 300 comprises a main combustion chamber 312 of generally L shape, with a laminated outer wall 310, comprised of an outer shell 314 of carbon steel, or other suitable material, an insulating lining 316, and an inner heat-resistant steel liner 318. The flame tube or combustion chamber comprises a cylindrical shell 330, of heat-resistant steel, which is flanged at its upper end, as indicated at 332, and is mounted on the wall 310 of the combustor. A burner 334 is mounted at the top of the chamber and is provided with a suitable igniter 336. The air inlet passage or duct 350 is divided by flange 332 into two feed zones 352, 354 to set up flow of the air as a downwardly spiralling vortex extending the length of the combustor. The combustion air, fed through duct 352, will discharge in a spiral path into primary combustion chamber 330 through louvres formed by vanes 353, while the cooling or diluting air will discharge from inlet 354, through louvres formed by vanes 355 into the upper part of the combustion chamber outside of the inner, heat-resistant steel shell. The air-borne supply of comminuted fuel and air is passed through the pneumatic flash pulverizer 230 and pipe 250 into the combustion chamber 330. The pulverized fuel, admixed under pressure with primary air, which is supplied in quantity sufficient for complete combustion of the fuel, is burned in chamber 330, the flame taking the downward path illustrated, a spiral flow being set up and maintained by the air flow introduced through the louvres formed by vanes 353. As shown in Fig. 5, the combustion chamber may be provided with a pilot fuel inlet, indicated generally by the numeral 337. At the lower open end of the flame tube of the combustion chamber 330, the completely combusted gases and entrained fly ash are mixed with a descending mantle or envelope of cooling air from chamber 322, which is supplied in quantities sufficient to reduce the temperature of the gases down to the operative optimum for the particular turbine equipment in use. The interior of the combustor will be seen to provide an inner combustion zone 320, an outer cooling zone 320a, and a lower mixing zone 324, with a discharge zone 326 discharging into the fly ash separator 370. Separator 370 comprises a box-like member having spaced top and bottom walls 371, 372, and a closed end wall 373 defining a central chamber 374 in free communication with the discharge outlet 326 of the combustor. A battery of small cyclone separators are mounted in the casing between the walls 371, 372, discharging clean combusted gases into an upper take-off chamber 375 and fly ash into a lower dust discharge channel or chamber 376, which may be provided with a descending dust discharge pipe 377, and a control or outlet valve 378.

In the form shown in Figs. 6, 7, 7a, 7b and 7c, there is illustrated a cyclone combustor incorporating means for preheating and increasing the velocity of the fluidized stream of pulverized solid combustible particles as it is discharged from the pulverizing nozzle and delivered to the burner of the combustor. The novel preheating means also serves for the pregasification of the pneumatically pulverized coal as discharged from the convergent divergent nozzle in the air-borne combustible solids feed line. The novel preheating and pregasification means is essentially comprised of a jacketed chamber heated by a side stream of hot motive fluid from the turbine inlet, the motive fluid discharging from the jacket through an annular orifice or jet formed between the mouth of the nozzle and the inlet duct of the chamber. The preheater chamber is provided further with a discharge pipe or burner which extends well into the chamber above the inlet, and discharges into the subjacent combustion chamber.

Considering the structure illustrated in Figs. 6, 7, 7a, 7b and 7c, the novel combustor will be seen to comprise a pressure tight cylindrical body 340, bottom 341, top 342, and a cylindrical jacket 343 disposed about the upper portion of the body 340. A secondary air duct 350A discharges into the jacket 343, and the latter into the combustion and mixing chamber 345 through louvres formed by vanes 346. A discharge pipe 325 extends well into the bottom of the chamber 345, and is provided with a foraminous screen 322, and a spaced deflector 323, as shown. The pipe 325 is connected, through a right angle bend, with the inlet duct 317 of the gas turbine. A line 315 is tapped into duct 317 and serves to take off a side stream of heated motive fluid, as will be described more in detail hereinafter.

The novel preheater and pregasification means, recited above, comprises a closed, double walled cylinder 360, mounted on the cover 342 of the combustor in pressure tight relation therewith. The double walled cylinder has an outer, cylindrical body 361, and a top 362, defining a jacketed chamber 363, with the body 364 and top 365 of the inner, closed cylinder, which forms a pregasification chamber 366, with the top 342 of the combustor 340. A burner tube 367 passes through the top 342 of the combustor and extends well into the chamber 366. A valved, ash draw-off 331 is provided in the bottom 341 of the combustor. A fluidized solids line 250 discharges through convergent nozzle 255 and duct 368, into chamber 366. The jacketed chamber 363 discharges through line 369 into chamber 380 which houses the convergent-divergent nozzle 255. The chamber 380 is in fluid communication with the duct 368. The side-stream line 315 is in fluid communication with the jacketed chamber 363.

Figure 6:
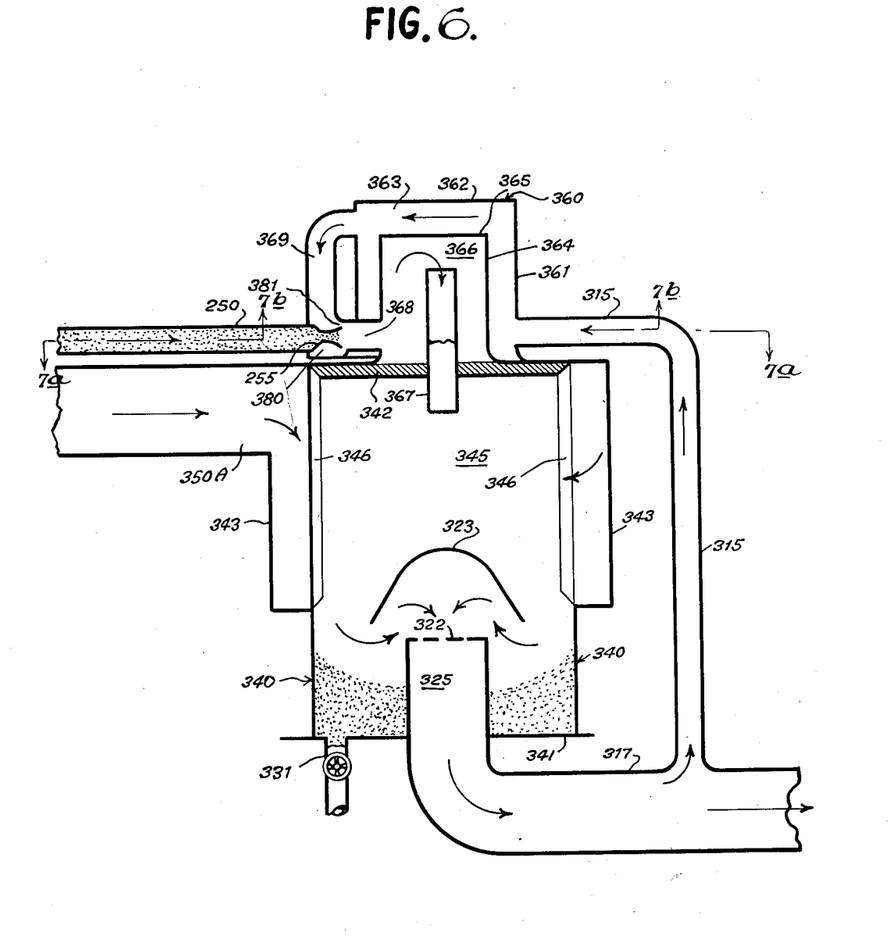
Fig. 6 is a vertical section of a pressure combustion chamber with a preheater.
Figure 7:
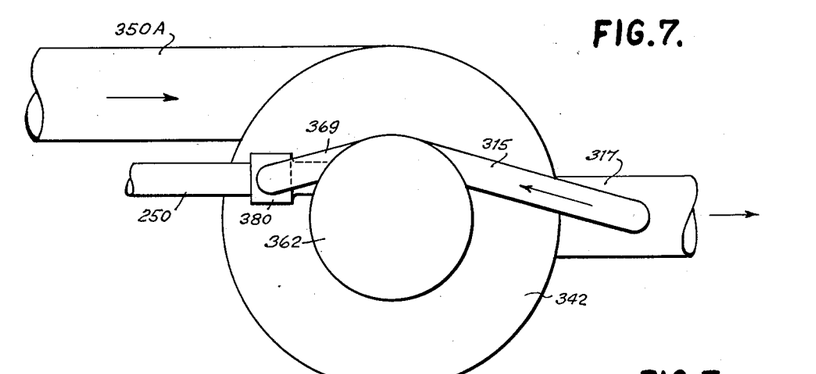
Fig. 7 is a plan view of the apparatus of Fig. 6.
Figure 7A:
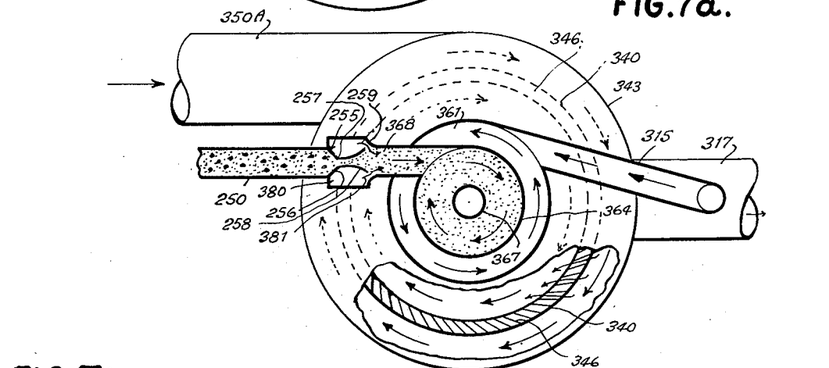
Fig. 7a is a horizontal cross-section taken on line 7a—7a of Fig. 6, looking down on the combustor, the roof being shown partly removed.
Figure 7B:
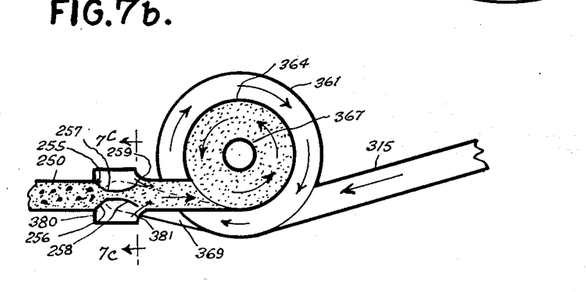
Fig. 7b is a horizontal cross-section taken on line 7b—7b of Fig. 6, looking up into the preheater.
Figure 7C:
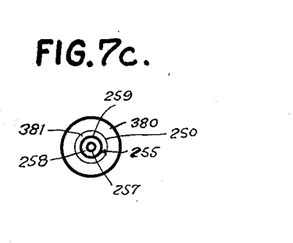
Fig. 7c is a vertical section taken on line 7c—7c of Fig. 7b and showing the annular orifice formed between the mouth of the pneumatic pulverizer nozzle and the inlet duct to the preheater.

The convergent-divergent nozzle 255 comprises a convergent inlet 256, throat 257, divergent outlet 258 and mouth 259. The mouth 259 of the nozzle extends into the mouth of duct 368 and defines an annular passage or jet 381 therewith.

The apparatus, described immediately above, provides an enhanced combustive efficiency of the fluidized solid fuel, due to the action of the pulverizing nozzle, and the instantaneous heating of the pulverized coal particles by the high temperature gas stream discharged from chamber 380 through annular jet 381 and duct 368 into the pregasification chamber 366. The efficiency of pulverization of the fluid-borne solids is enhanced by the action of the heated gas stream on the fluidized solids in the stream issuing from the nozzle. The high temperature annular gas stream envelops and heats the core stream of fluidized pulverulent solids thereby increasing the tendency of the particles to disintegrate. The coflowing streams are simultaneously mixed and projected, as a tangential flow, against the wall 364, of chamber 366, as an impact surface, whereby the residual, oversize particles are further reduced. Due to the positioning of the inlet of burner tube 367 within chamber 366, the flowing stream of fluidized pulverulent solids is caused to flow spirally, with any oversize particles being abraded against the wall and reduced in their whirling travel to the mouth of burner tube 367, into which they are carried by the outflowing gases from the combustor.

The secondary air delivered into the combustion chamber 345 is given a vortical spinning motion by the louvre vanes 346 as it discharges from the cylindrical jacket 343, and forms a coflowing envelope of cooling and diluting air for the products of combustion delivered from the burner tube 367.

The side stream of highly heated motive fluid withdrawn through line 315 forms an essentially closed circuit in its path through the preheater jacket chamber 363, the nozzle preheater chamber 380, annular jet nozzle 381, duct 368, pregasification chamber 366, combustor chamber 345, and turbine feed line 317. With this closed circuit and the intimate mixture of highly heated combustion air with the fluidized combustible solids, at a temperature of the order of 1000° F. (the turbine motive fluid desirably approximating 1300° F.), a maximum efficiency of combustion is obtained, over and above the improved disintegration and pulverization of the fluidized solids due to the pneumatic pulverization being effected under optimum conditions of fluid temperature. Where the solid combustible is of the coking coal type, or generates appreciable quantities of pyrolytic degradation products at high temperatures, the conjoint preheating and reduction in particle size effected in the preheater will be accompanied by a continuous devolatilization of the pulverulent particles in the preheating side stream of combustion air. This will result in the simultaneous coking of the particles and carburetting of the combustion air stream, so that the combustible solids are delivered to the burner in a combustion-supporting gaseous combustible, and combustion will be effected uniformly in the flame. The combustible particles will be raised to incandescence by the burning envelope of gaseous combustible around each particle, and will not depend upon radiant heat from particle to particle to effect flame propagation. It will be seen, therefore, that the use of preheated supplementary air, admitted to the air-borne solids stream downstream of the pulverizer nozzle, and the resulting stream introduced tangentially into a cylindrical chamber (366), will augment the centrifugal action on the solid particles and will afford a greatly increased degree of pulverization, as well as a marked degree of devolatilization of the whirling coal mass. By the use of either this system or the one illustrated in Figs. 3 to 5, a maximum of combustion products, i. e. heated and properly tempered combustion gases, are formed and delivered, under pressure, in an apparatus requiring a minimum of over-all size for the weight or tonnage of coal handled. By the provision of descending vertical combustion and cooling columns in a cylindrical apparatus, the size of the latter is reducible to an absolute minimum, while maintaining the necessary length or path for travel of the particles to be burned to permit the proper and complete combustion of the same. Additionally, due to the fact that the system is maintained under pressure, the combustion of the fuel particles is greatly facilitated and speeded up so that the usual enormous bulk of equipment required in conventional gas producers and other like units is completely done away with. The advantages of this type of construction, as shown in Figs. 6, 7, 7a, 7b and 7c, are further enhanced by a provision of regenerative heating of the air supply for combustion, and for cooling or diluting the primary products of combustion. Likewise waste hot gas can be supplied for the purpose of drying and conveying the initially ground or comminuted fuel supplied to the storage hoppers.

Figure 9:
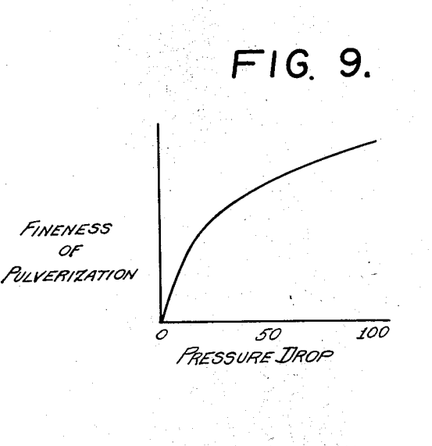
Figs. 9 and 10 are graphs showing the fineness of pulverization plotted against pressure drop, and pound of air per pound of coal, respectively.
Figure 10:
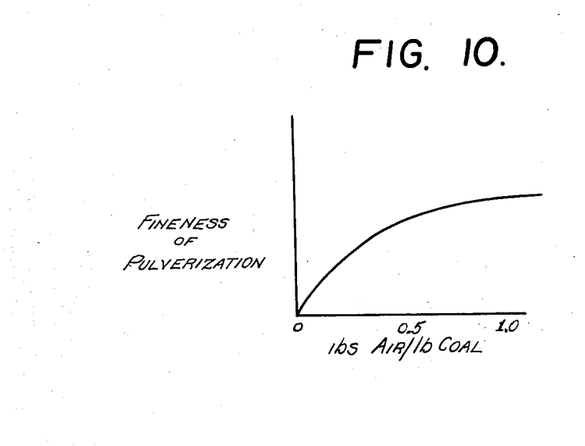

I have found that it is possible to pulverize crushed coal by the simple process of causing it to pass with compressed air, through a convergent nozzle, where the pressure on the coal particles is released almost instantaneously. The performance of the convergent nozzle, as to fineness of pulverization plotted against the pressure of the air, and plotted against the ratio of air-to-coal, is schematically indicated in Figs. 9 and 10, respectively. The design of the preheater herein to function as a simple attrition device, after the nozzle, enables me to employ as much as possible of the kinetic energy in the coal-air stream, to produce a fuel so fine that 80% will pass through a 325 mesh sieve.

The utility of the pneumatic coal pulverizer in the gas turbine system herein can be estimated by comparing first cost and operating and maintenance costs of a mechanical pulverizer, having several moving parts and a large driving motor, with similar parts for an auxiliary compressor, to take air from the main compressor and boost the pressure to perhaps 140 p. s. i. The pneumatic coal pulverizer, or flash-pulverizer herein, has, of itself, no moving parts, and its operative life is almost indefinite, being conditioned only by a minor degree of abrasion of the nozzle, which can be compensated for or taken care of by using a hard facing material, such as boron carbide or tungsten carbide. Less than 2% of the shaft power of the turbine is required to drive the auxiliary compressor. Thus, the only work which can be charged against the pneumatic pulverizer is that required to boost the pressure of the combustion air which, when it enters the combustor, joins the rest of the air, and is equally effective in doing work as it passes through the turbine as part of the combustion gas cycle.

In the invention herein, crushed coal of 16 mesh, or thereabouts, air-borne in a stream of heated air or steam, at 120–140 lbs. per square inch pressure is passed through the convergent nozzle, which is so constituted and arranged as to effect a pressure reduction of the order of 80 p. s. i. down to a pressure approximately as great as that in the combustor.

Under observed conditions of operation, it is found that with 16 mesh particles fed to the high pressure side of the nozzle, the material discharged at the low pressure or outlet side of the nozzle will be characterized by a particle size of 200 mesh, for some 65% of the delivered product.

For gas turbine service the coal must be under pressure in order to enter the combustion chamber. I have determined that an excess pressure of some 80 lbs. air must be maintained on the upstream side to give satisfactory pulverization. Tests with a flash pulverizer show that there are certain peculiar properties of the convergent-divergent nozzle which are of distinct advantage in the system herein. Using such a nozzle which is so constructed that the angle between divergent sides can be varied continuously over a wide range, I have found that, if the angle is adjusted properly, for a given set of conditions, the pressure of air flowing through the nozzle can be made to fall almost to atmospheric pressure, and then to rise again, to approximate the pressure obtaining in the combustion chamber.

The gas turbine herein may be of any suitable construction and preferably designed to operate on the so-called open cycle. Considering the showing in Fig. 8, the open gas cycle turbine may be briefly described as follows:

Air is drawn from the surrounding atmosphere by the main compressor, and its pressure is raised to an appropriate value, usually about 60 to 75 p. s. i. a. The temperature of this air, already warmed by compression, can be further raised by transferring to it some of the heat which is being discharged from the exhaust of the turbine. The regenerator can, with reasonable surface, recover from 50% to 75% of the available heat in the air leaving the turbine, and it is quite feasible to introduce the compressed air into the combustor at a temperature well above 600° F. The open-cycle combustor is characterized by the direct burning of the fuel with the exact quantity of air required for complete combustion, which volume is a minor portion of the total air supplied. The remaining air is used for cooling the combustion chamber itself, and for subsequent mixture with the products of combustion, to reduce their temperature to a level at which the turbine can operate safely.

Figure 8:
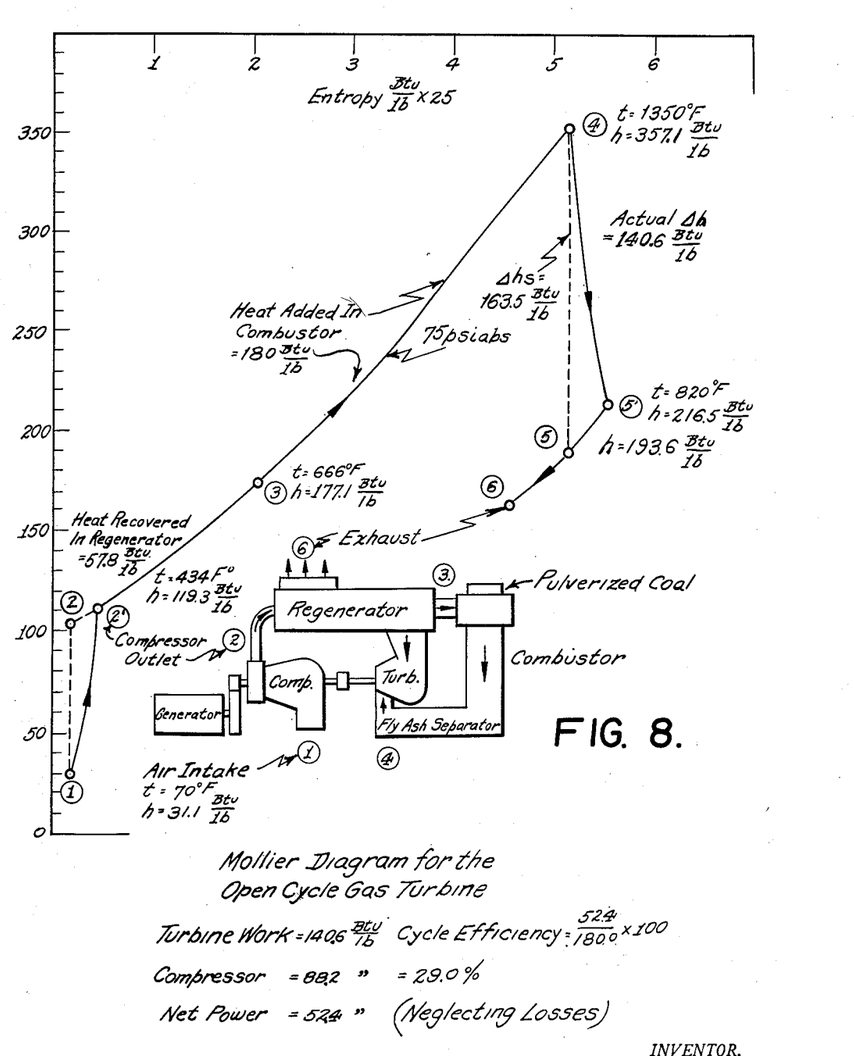
Fig. 8 is a Mollier diagram for the open-cycle gas-turbine.

The major problems involved in making the gas turbine burn coal are clearly delineated in Fig. 8. Not only must the system be effective for preparing pulverized solid fuel, such as coal, for combustion in such a manner that it can be burned within the limited space available on a locomotive or ship, but the solid residue of the products of combustion must be substantially completely removed in order that the blades of the turbine shall have a reasonable life. The system herein effectively solves this problem and provides a power generating system which is equally adaptable to stationary and marine applications, as well as locomotive purposes, and particularly wherever water is lacking. Even at coal mines, where large quantities of power are needed to operate mechanical equipment, good water is customarily not present in large quantities, and the coal-burning gas turbine system herein is especially adapted to serve as an economical prime mover.

Figure 1:
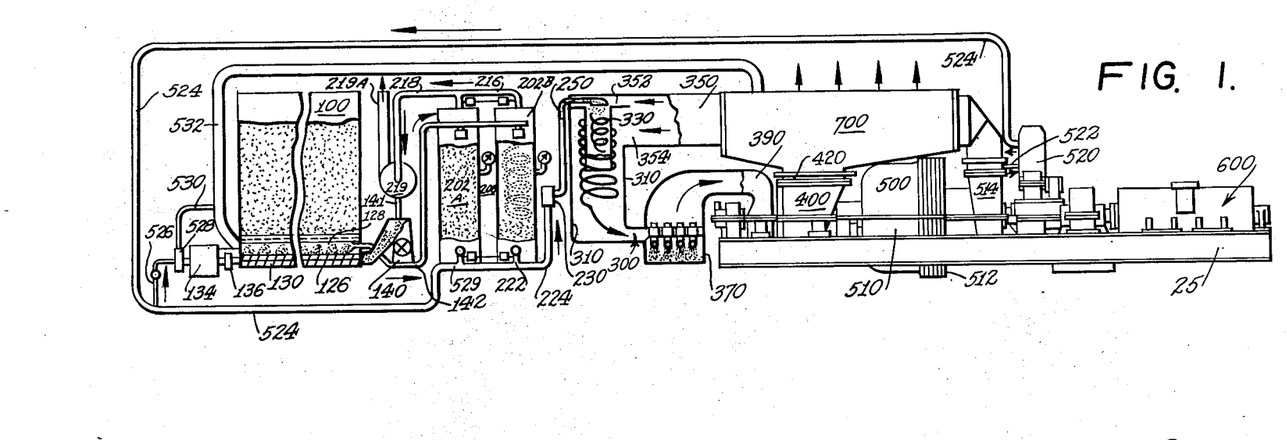
Fig. 1 is a diagrammatic showing of a gas-turbine power plant with the combustor shown in vertical section.

As shown in Fig. 1, the turbine 400 will be mounted on a suitable base 25 which also serves to support the air compressors and generating unit at the other end. The air compressors and generating unit will be in alignment with the turbine, the compressors being mounted on the same shaft and driven thereby. The reduction gear 610 is connected through the coupling 612 to generator 600 which may comprise any specific or desired number of units. As contemplated herein four 1,000 H. P. generators will deliver about 4,000 electrical H. P. with less than 1 lb. of coal per H. P. hour.

The regenerator 700 is mounted in the turbine exhaust duct of the turbine casing and connected therewith by means of an exhaust duct 420. As no invention is predicated on the specific construction of the turbine, the details thereof will not be described.

*Air compressor and regenerator*

The feature of the present invention embodying the conveying of the comminuted coal by air is of maximum importance as it accomplishes drying and transferring of the initially crushed coal from the crusher to the pressure hoppers, and from the latter to the combustor.

The air compressor system of the present invention is essentially comprised as follows:

As shown in Fig. 1, an air compressor 500, provided with air intake silencers 512, is driven by shaft 410 of gas turbine 400. This compressor discharges through outlet duct 514, regenerator 700, and air duct 350, to the combustor 300. A second, high pressure compressor 520 is mounted on the turbine shaft, and is provided with an inlet pipe 522 connecting with the discharge side of outlet duct 514 of the main compressor 500. This high pressure compressor is provided with a discharge line 524 which connects directly at the outlet or discharge 262 of the pressure storage chamber 200 with fluidized solids feed line 224 leading to the combustor 300. A valved branch line 526 supplies high pressure air to engine 528 which drives the coal feeder screw 126 through gear box 134 and coupling 136. Line 530 carries the expanding exhaust from this engine into waste heat line 532 which is tapped into the turbine exhaust, as shown.

The main compressor 510 delivers the main charge of air through regenerator 700, whence it passes through duct 350 into combustor 300. The combustively heated air (motive fluid) passes through the turbine and discharges into the exhaust duct, in heat-exchanging relation with the regenerator, thence out to the atmosphere, a certain portion thereof being withdrawn through pipe 532 and delivered to the coal bunker as drying and carrying air. The air delivered into the bunker may be directed to the trough thereof, below the feeder plates 128 (Fig. 1), and will serve to effect an initial drying of the coal deposited in and conveyed by the screw conveyor 126. At the outlet end of the conveyor, a further quantity of hot air is added, from the conveyor motor exhaust 530, in the crusher and dryer to complete the drying of the coal, as it is ground to the desired 16 mesh size. Waste hot air may also be supplied to the coal bunker at the top thereof, or any point intermediate the structure, or in both hoppers, where bi-lateral, symmetrical hoppers are used. The coal bunkers being hermetically sealed or closed, and the main hot air supply being introduced into the trough 130, a negative pressure will be established by suction fan 219 at the outlet of the pressure tank system sufficient to draw the crushed and dried coal through the pneumatic conveyor 142 into pressure tank system 200.

*Air system*

In the pressure tank system 200, the aspirated waste hot air is separated from the entrained or air-borne 16-mesh fuel, and is discharged to the atmosphere through vents 216 by means of suction fan 219. The auxiliary compressor 520 is adapted to deliver air at higher compression than main compressor 510. This high compression air is delivered through high pressure line 524 (Fig. 2), to the discharge pipe 262 of the pressure feeder 260, at which point the charge of crushed coal is introduced into the constant pressure air stream to form therewith a streaming entrainment of solid particles. This streaming entrainment discharges through solids feed line 224, pneumatic flash pulverizer 230, and feed pipe 250, to combustor 300.

Considering the general operation of the system and with particular reference to the air system, and the combustion system, it is to be noted that air compressed to 75 p. s. i. a., and heated to 1300° F., drives the turbine. It is noted further that the high-pressure air required for the pneumatic pulverization of the initially crushed coal is provided by a second, high pressure compressor. The waste heat from the turbine exhaust is utilized for generating train heating steam and for other services. Waste hot air from the turbine exhaust will be delivered to the coal bunker, serving to dry the coal. A suction fan is provided for drawing the coal through the crusher and drying the same, as well as conveying the crushed and dried coal into the pressure storage chambers where the air is separated from the entrained particles and vented to the atmosphere. Desirably, such a system will include a means for recovering the fines, as illustrated in Fig. 1. Here the vent pipe 218 discharges into a suction fan, which also acts as a separator. The fines separated out here are returned through pipe 141 to the crusher 140 where they are mixed with freshly ground and dried coal and transported to the pressure storage chambers 200. A high pressure air stream, at 140 p. s. i., serves to transport the ground coal from the storage chambers through the pneumatic pulverizer in the combustor feed line, where the pressure is dropped to 65 p. s. i., with resulting flash pulverization of the coal, which is immediately burned in a special combustion chamber. The products of combustion are diluted with air from the main compressor and preheated in the regenerator to reduce the temperature to 1300° F. to drive the turbine. Because of the high degree of pulverization effected in the pneumatic pulverizer and the use of the vortex type of combustor, a heat release in excess of 1,500,000 B. t. u. per hour per cubic foot is attained.

It is well known that in the operation of gas turbines the power developed varies directly as the quantity of fuel fed to the combustor. By varying the quantity of fuel supplied to the combustor, the speed of the turbine is directly controlled, and without any appreciable lag, so that true throttle control, characteristic of gasoline engines, can be said to obtain. In the present system, this desirable throttle control can be secured by varying the solid fuel feed to the combustor.

Figure 2:
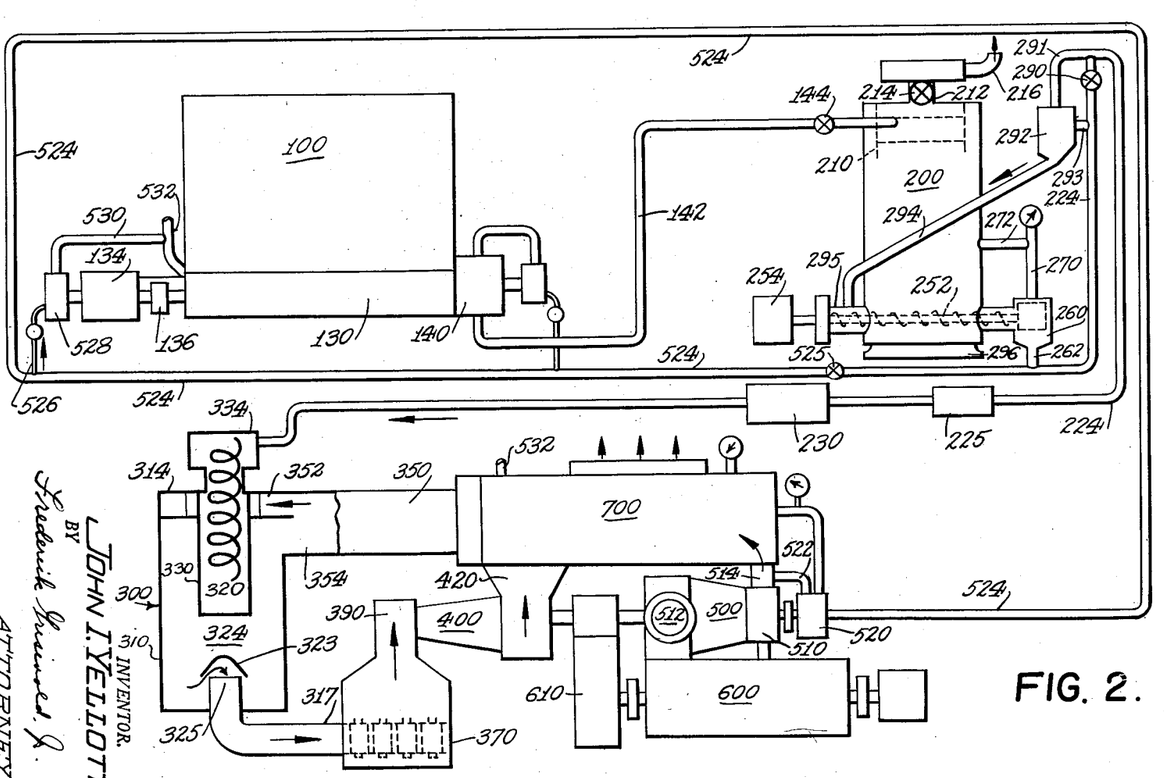
Fig. 2 is a diagrammatic showing of a coal-burning gas-turbine system including recirculator control elements for the fuel delivery system.
Figures 3, 4, 5:
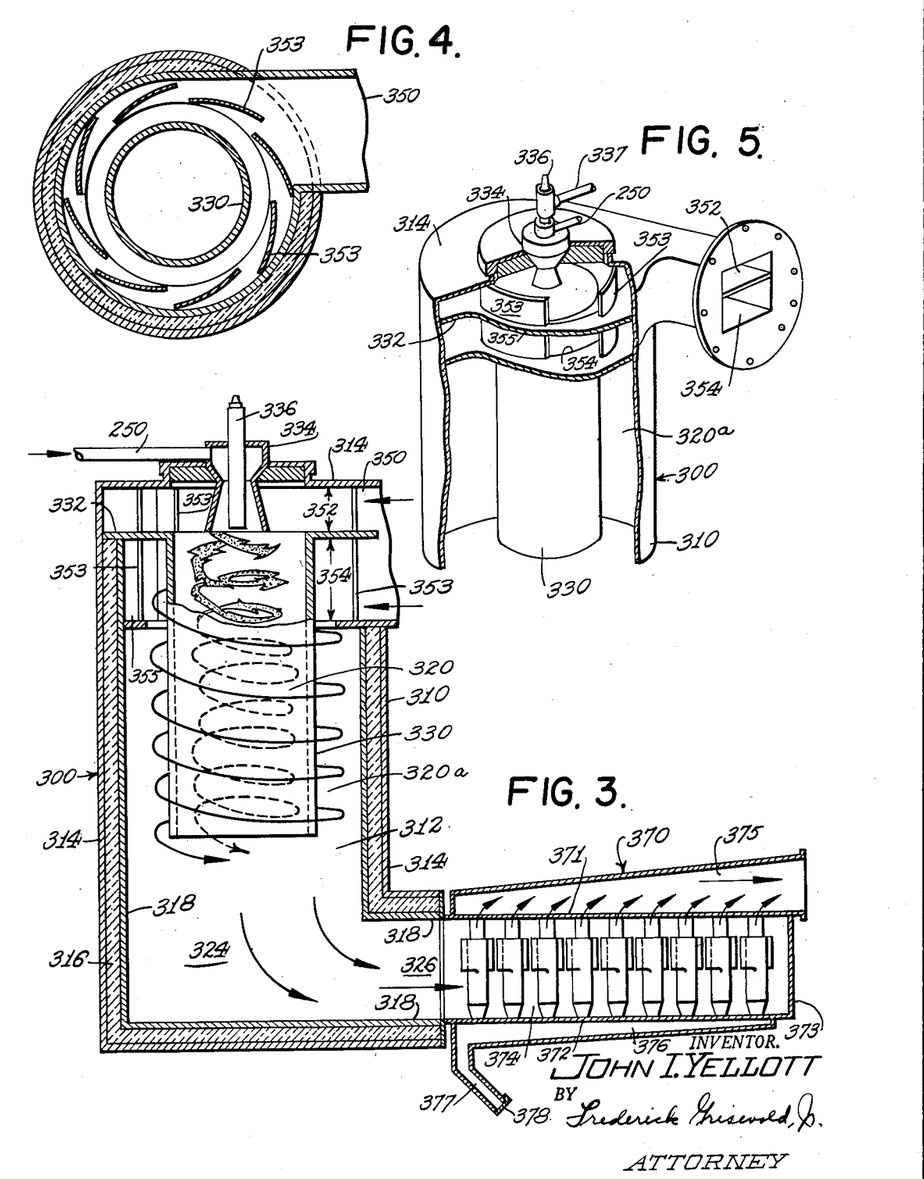

One system utilized is illustrated schematically in Fig. 2, in connection with the over-all system previously described. In this system, a recirculator control valve 290 is interposed in the comminuted fuel feed line 224 from the pressure storage tank or hoppers 200. A by-pass pipe 291 is connected in the feed line, on the down-stream side of the valve, and serves as an outlet for the cyclone separator 292. A second pipe 293, connects feed line 224, upstream of valve 290, with the separator 292. These connections establish a by-pass around valve 290, placing both the upstream and downstream segments of feed line 224 in uninterrupted pneumatic connection. The cyclone separator is connected through downcomer pipe 294 with a casing 295 formed as a housing for a rearward extension of feeder screw 252. With the main valve 525 of the high pressure air line open, and variable speed motor 254, driving feed screw 252, being set in operation, the comminuted coal will be fed from the pressure storage tank 200 through hopper 260 and delivery pipe 262 into the high pressure air feed line 224. If valve 290 is closed, the circulation of the airborne comminuted fuel will be by-passed through pipe 293 into cyclone separator 292, where the air is separated from the coal and delivered through pipe 291 into the down-stream side of the feed line, while the separated coal is returned through down-comer 294 and chamber 295 back into the tank 200, giving a cyclic course to the system.

The high pressure air supplied to combustor feed line 224 is maintained constant in volume and pressure, and only the quantity or amount of coal delivered by the feed line is varied. As the control valve 290 is opened, the volume of airborne coal which is recirculated through the cyclone and downcomer back to the rear end of the coal feed screw is progressively diminished. This connotes a progressive increase in the quantity of air-borne comminuted fuel which is passed through the recirculator control valve and down stream side of line 224. Through meter 225, into coal pulverizer 230, delivery pipe 250, and combustor 300. While the pulverizer has been shown as incorporated in the line 250, it will, of course, be understood that the pneumatic flash-pulverizer may be incorporated in the inlet of the combustor as previously described. By the use of a meter 225, the air and coal flow can be accurately measured, and the operator can have instant, instrument-board control, of the system. Thus, the control valve 290 may be suitably connected to the throttle so that the speed of the gas turbine is directly responsive to its manipulation. It is preferred that the valve 290 be of the quick-operating, gate-valve type, permitting operation from full throttle to idling speed to be made rapidly as the throttle lever can be manipulated.

With the recirculator control valve wide open, the full quantity of comminuted coal delivered at the hopper outlet through discharge high pressure air line 262 into pipe 224 will be delivered to the pulverizer. As the valve is throttled down the pressure on its upstream side increases, so that more coal-carrying fluid is forced through pipe 293 into the cyclone separator, where the coal contained therein is separated from the air. The cleaned air, freed of coal particles, passes downstream through pipe 291, merging with the rest of the air, thereby reducing its charge of coal, so that the full quantity of air supplied to the down-stream side of line 224, has its content of comminuted fuel varied according to the back-pressure set up on pipe 293, with consequent by-passing and removal of the fuel. The free-flowing, comminuted fuel discharged from the cyclone separator 292 into downcomer 294 will act as a plug, if present in sufficient volume, as will obtain when the system is throttled down, as indicated above. Thus, no back-pressure will be developed in the pressure tank 200, and the delivery of the comminuted coal from the container will depend solely on the aspiration thereof by the constant pressure stream of compressed air flowing into and through line 224. To insure closer control of the operation of the system, the fuel containers 200 may be provided with built-in weighing devices 293. These devices can be connected to automatic recording and control instruments on the instrument board. These instruments may include flow charts calibrated to read in terms of fuel discharge and train speed, thereby insuring that the operator has absolute control of the operation of his equipment, including the shift of comminuted coal feed from one tank to another. Of course, this shifting of fuel feed from one tank to the other can be entirely automatic and, to this end, the weighing devices 296 may be suitably coupled to the necessary shifting mechanisms for appropriate control valves as well as the auxiliary air-feed valves.

To recapitulate, the by-pass or recirculatory control system described immediately above comprehends the delivery, under running conditions, from idling speed to top speed, of a constant pressure stream of compressed air from the high pressure compressor to the coal pulverizer, the volume of fluid delivered being predetermined or regulated according to the existing atmospheric conditions, that is, as to temperature, air pressure, moisture, etc. In this constant volume and constant pressure stream of carrier fluid, varying quantities of air-borne, comminuted fuel are passed through the pneumatic pulverizer into the combustor. This desirable result is attained by splitting the air stream, bearing a fixed quantity or charge of fuel, into two fractions, one of which retains its full quantum of comminuted fuel, and the other of which is substantially stripped of its solid fuel content and mixed with the first quantum to dilute and thereby reduce its solid fuel content, while maintaining the carrying fluid itself constant in volume and pressure. Thus, the sole variable in the system here described is the actual quantity of comminuted fuel fed to the combustion system. Because of the fact that the combustion gases generated in the combustor depend on the quantity of fuel supplied, and because of the further fact that the speed of operation of the gas turbine varies directly as the volume of gaseous products of combustion delivered thereto, the power developed by the gas turbine is subject to substantially instantaneous throttle control. All of this without mechanical linkages and requiring but a single manipulation, namely that of the throttle, and not requiring the manipulation of any auxiliary control equipment. The use of constant volume, constant pressure air streams in the various parts of the system, and particularly in the input side of the combustor, permits the maintenance of the desirable 80 p. s. i. differential between the input and output sides of the pneumatic pulverizer. This assures the maintenance of a uniform condition of pulverization or flash disintegration of the comminuted fuel in the flash-pulverizer, and delivery of a uniformly dispersed, air-borne fuel charge into the combustor.

Where a constant pressure stream of carrier fluid is used in a system embodying no recirculator control, the amount of fuel solids delivered into the stream will be controlled directly by varying the speed of the variable-speed, screw feed motor, as shown in the drawings. This system, as with a true recirculatory system, permits direct control of the speed by controlling the amount of fuel fed to the combustor. The immediate control in the present case is the control of the screw feed motor which is carried out as a throttle control, the auxiliary factors of air pressure, rate of flow and temperature being controlled by presetting of appropriate control instruments.

It will now be appreciated that there has been provided novel pressurized combustion systems for utilizing pulverized solid fuels in which the products of combustion of the system, mixed with air, are fed, as motive fluid, into a gas turbine, mounted on a common shaft with a main compressor, and coupled to a generator or mechanical power translating mechanism. The necessary compressed air for maintaining the pressure combustion system with a pressure drop of the order of 80 p. s. i. between the combustor feed line and the combustor chamber is supplied by a second, high pressure compressor. The waste heat from the regenerator is used in a pressure fluid stream to transport the raw fuel from a bunker, through a breaker or crusher, to a crushed fuel storage chamber, where it is de-aerated, and from whence it is transported, in a separate stream of high-pressure compressed air, to the combustor feeding the gas turbine. The system herein has been shown to be particularly adapted for locomotive use, and the special assemblage of cooperating parts has been shown to have novel and desirable characteristics importing unpredictable efficiencies and operating factors in such use. Additionally, the power units herein have been shown to be adapted for use generally in marine installations and in power plants, particularly those located in localities where pure water is not available. Because of the fact that the system herein does not require the use of water or steam as motive fluids, appreciable over-all savings in equipment and installation and maintenance costs for the same are made possible.

Various modifications will occur to those skilled in the art in the composition, configuration and disposition of the component elements going to make up the invention as a whole as well as in the selection and combination of particular features for specific purposes, and no limitation is intended by the phraseology in the foregoing description or illustrations in the accompanying drawings except as indicated in the appended claims.

What is claimed is:

1. Apparatus for burning powdered fuel and adapted to deliver ash-free gases, comprising a vertically disposed outer cylindrical mixing chamber and an inner, concentric cylindrical combustion chamber, means for flowing admixed fuel and combustion air tangentially into said combustion chamber, whereby the fuel is burned with the formation of gaseous products of combustion and solid combustion residues, called fly ash, the fly ash being suspended in the gaseous combustion products, means for blowing cooling air tangentially around the said combustion chamber and into said mixing chamber to mix with the products of combustion from the combustion chamber, the said tangential streams being co-flowing, a subjacent discharge duct leading from the said mixing chamber, and means in the said duct for separating contained fly-ash from the gaseous stream.

2. In a pulverized coal-fired apparatus for generating motive-power gas under pressure, in combination, a pressurized combustor, a crushed coal supply chamber, pneumatic means for feeding combustive air-borne crushed coal from said chamber to the combustor at a pressure above the pressure in the combustor, pulverizing means comprising a convergent nozzle in the pneumatic coal feeding means from said supply chamber to the combustor, means for supplying preheated combustion air to the air-borne pulverized coal downstream of the convergent nozzle, and means for supplying cooling air to the products of combustion of the pulverized coal in the combustor.

3. In a pulverized coal-fired apparatus for generating motive power gas under pressure, in combination, a pressurized combustor, a motive fluid discharge line for the combustor, a jacketed preheater in fluid communication with the combustor, a crushed coal supply chamber, pneumatic means for feeding air-borne crushed coal from said chamber through the preheater to the combustor at a pressure above the pressure in the combustor, pneumatic pulverizing means comprising a convergent nozzle in the pneumatic coal feeding means from said coal supply chamber and discharging into the preheater and forming an annular jet therewith, means for supplying a side stream of hot motive fluid to the jacket of the preheater, means for passing the hot motive fluid from the preheater around the said convergent nozzle and through the said annular jet, whereby the annular stream of hot motive fluid discharges into the preheater with the air-borne pulverulent coal stream from the convergent nozzle and effects pregasification of the gas-forming constituents of the coal, the resulting combustible fluid discharging into the combustor, and means for supplying cooling air to the products of combustion of the pulverized coal in the combustor, whereby a motive fluid is formed.

4. Motive fluid generator according to claim 3, in which the inlets to the preheater chamber and to the preheater jacket are tangentially disposed, and the burner tube connecting the preheater chamber and the combustor extends well into the preheater chamber, whereby the heated, solids-bearing combustible fluid is caused to flow in a spiral, in heat-exchanging relation with the jacketed walls of the chamber, and is discharged into and through the burner tube as a carburetted, highly heated, combustion-supporting, pulverized solids-bearing combustible gas stream.

JOHN I. YELLOTT.

REFERENCES CITED

The following references are of record in the file of this patent:

UNITED STATES PATENTS

| Number | Name | Date |
|---|---|---|
| 730,782 | Morrison | June 9, 1903 |
| 1,163,650 | Fogler | Dec. 14, 1915 |
| 1,197,456 | Dinsmore | Sept. 5, 1916 |
| 1,455,392 | Diepschlog | May 15, 1923 |
| 1,468,008 | Dyson | Sept. 18, 1923 |
| 1,559,170 | Jackson | Oct. 27, 1925 |
| 1,591,679 | Hawley | July 6, 1926 |
| 1,618,808 | Burg | Feb. 22, 1927 |
| 1,627,766 | Bergman | May 10, 1927 |
| 1,628,609 | Newhouse | May 10, 1927 |
| 2,039,890 | de Coster | May 5, 1936 |
| 2,055,385 | Noack | Sept. 22, 1936 |
| 2,103,453 | Graemiger | Dec. 28, 1937 |
| 2,140,991 | Frisch | Dec. 20, 1938 |
| 2,616,252 | Robinson et al. | Nov. 4, 1952 |

FOREIGN PATENTS

| Number | Country | Date |
|---|---|---|
| 391,315 | France | Oct. 28, 1908 |
| 413,697 | Great Britain | July 18, 1934 |
| 484,289 | Great Britain | May 3, 1938 |
| 541,845 | Great Britain | Dec. 15, 1941 |